Nov. 27, 1956 — E. O. HILLER — 2,771,630
CRAB MEAT EXTRACTOR
Filed Aug. 26, 1954 — 3 Sheets-Sheet 1

INVENTOR
EVERETT O. HILLER
BY John B. Willard
ATTORNEY

Nov. 27, 1956

E. O. HILLER 2,771,630

CRAB MEAT EXTRACTOR

Filed Aug. 26, 1954

INVENTOR
EVERETT O. HILLER
BY John B. Willard
ATTORNEY

Nov. 27, 1956  E. O. HILLER  2,771,630
CRAB MEAT EXTRACTOR
Filed Aug. 26, 1954                                       3 Sheets-Sheet 3

INVENTOR
EVERETT O. HILLER
BY *John B. Willard*
ATTORNEY

United States Patent Office 2,771,630
Patented Nov. 27, 1956

2,771,630

CRAB MEAT EXTRACTOR

Everett O. Hiller, Centerville, Mass., assignor to Hartford National Bank & Trust Company, Hartford, Conn., as trustee Application August 26, 1954, Serial No. 452,300

8 Claims. (Cl. 17—2)

The present invention relates to the recovery of meat from crabs, such as the common edible crabs of the Atlantic coast of the United States. More particularly, the invention is concerned with a novel machine with which the meat of crabs may be readily removed from the shell.

The body meat in a crab can be recovered by removing from the carcass a substantially cylindrical core extending inwardly from the ventral side and terminating at the inner surface of the carapace. The cutting and removal of such a core can be effected with suitable means, such as a trepanning tool rotated at high speed. My co-pending application Serial No. 391,510, filed November 12, 1953, illustrates such core cutting and removal apparatus. The core referred to, extends into the main visceral cavity directly beneath the carapace and includes a part of the main longitudinal partition within the body and portions of lateral partitions. The preferred cut is circular except for a portion of the relatively straight hinge where tail is attached to carapace. This gives maximum openings for discharge of meat and gives a "flat" which is used for registration of core within the spinner head. After these partitions are cut through, the core is readily removed from the carapace.

In a core so produced, the meat lies in compartments separated by the skeletal partitions, but the compartments are open at the circumference of the core. Accordingly, upon rotation of the core at high speed about its axis, the meat is thrown free of the compartments by centrifugal force.

Apparatus embodying the present invention effects the centrifugal removal of the meat from the core without manual operations other than the loading of the core into the machine and removal of the skeletal core after the meat has been centrifugally extracted therefrom.

The new apparatus includes a holder in which the core is secured with the ventral side lowermost and the carapace side uppermost. The holder provides support for the fragile skeletal partitions which prevent them from being broken by centrifugal force and from being discharged from the holder with the meat, the free discharge of which is unhindered by the holder.

The holder has the further advantage of automatically opening for unloading and reloading when not spinning, and automatically closing and providing the support for the core when the holder is rotated.

A further advantage of the present invention is the provision of automatically orienting the holder in the same position for loading and unloading whenever the holder is not rotating.

A still further advantage resides in the drive which provides for rapid acceleration and deceleration in addition to orientation for the centrifugal holder.

It is an object of the invention to provide apparatus having the described advantages which may be economically manufactured and which is simple and safe in operation to extract the meat in a minimum of time and without excessive damage.

These and other objects and advantages of the invention are pointed out in greater detail or will be apparent from the following description of the embodiment shown in the accompanying drawings, in which.

Figure 1:
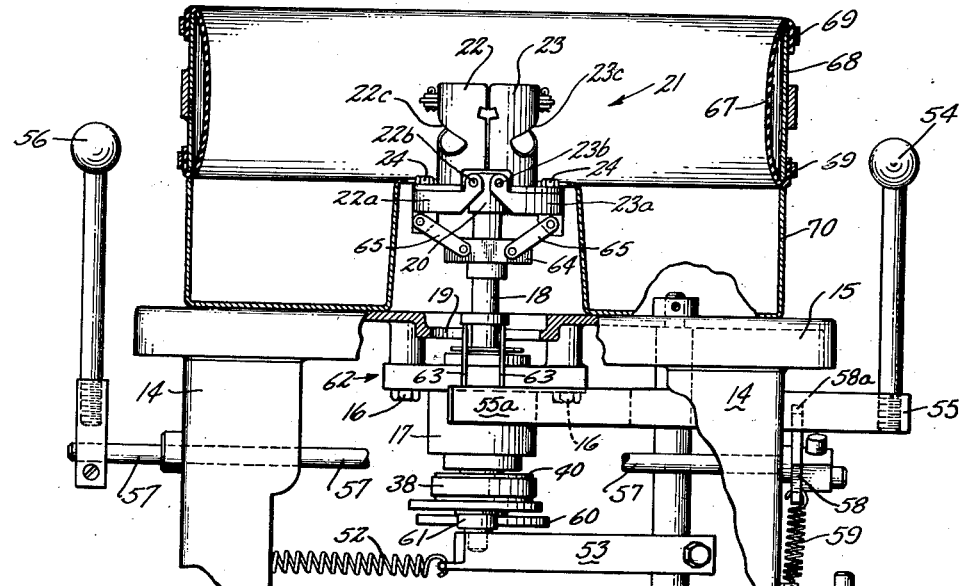
Fig. 1 is a front elevation view partially broken away and in cross-section of apparatus embodying the present invention.
Figure 5:
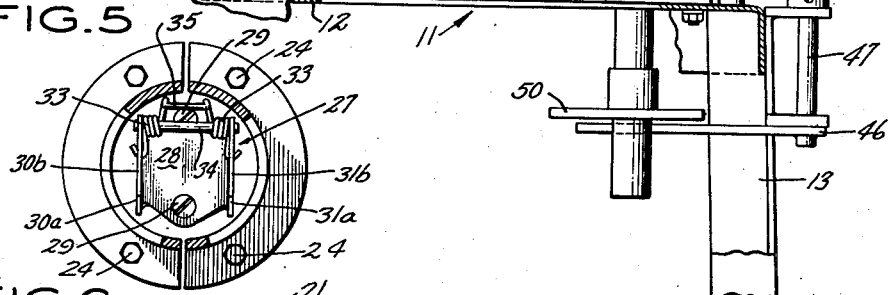
Fig. 5 is a cross-sectional view of the closed holder taken on line 5—5 of Fig. 6.

Referring to the drawings, the apparatus illustrated comprises a base or frame generally designated 11 which includes a horizontal lower table 12 and supporting legs 13. Four corner members 14 are fastened to and extend upwardly from the table 12 to support horizontally disposed upper table 15.

As shown in Fig. 1, secured to the under side of the table 15 as by bolts 16, is a bearing block 17 in which is rotatably journalled a vertically disposed shaft 18 that extends upwardly through a concentric opening 19 in the upper table 15. Secured to the upper end of the shaft 18 is a generally cylindrical main block 20 of a core holder generally designated 21.

Figure 3:
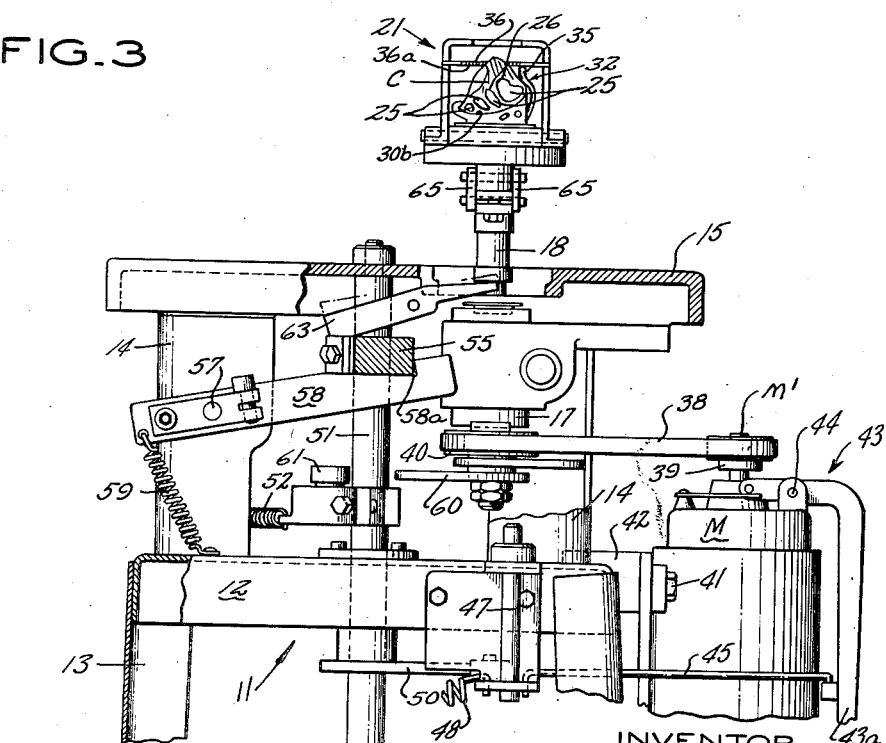
Fig. 3 is a side elevation partly broken away and in cross-section of the apparatus shown in Fig. 1 with half of the holder removed to better show the position of the core within the holder.

More particularly, the core holder 21 includes a pair of members 22, 23, each of which is a half of a cylinder divided along diametrically opposite elements. The two members 22 and 23 of the holder 21 are secured as by bolts 24 to base members 22a and 23a which are pivotally mounted by their respective pivot pins 22b and 23b on the block 20 so that the holders 22 and 23 pivot between the closed position, shown in Figs. 1 and 3-6, and the open position, shown in Fig. 7. As shown in Figs. 1, 5, 6 and 7, the holder walls 22 and 23 are arcuately cut away at 22c and 23c, respectively, so that as shown in Fig. 3, when a crab core C is properly located within the closed members 22, 23, the outlets 25 from the core C are aligned with the openings 22c, 23c and the skeletal partitions 26 which define the core outlets 25, engage and are supported by the walls of the holder members 22, 23.

As shown in Figs. 3 and 5–7, a chuck holder, generally designated 27, is secured to the block 20 and provides means for resiliently and removably supporting the crab core C within the cylindrical members 22, 23.

More particularly, the holder 27 includes a base portion 28 which is secured as by screws 29 to the top of the block 20 and from which spaced parallel side walls 30, 31 project vertically upward. The forward ends of the walls are shaped to form hooks 30a, 31a, respectively, under which the front portion of the core C may be secured. As shown in Fig. 3, the portion of the core C which was nearest the carapace, is uppermost and the under shell of the crab is located under the hooks 30a, 31a and supported on the curved upper edges 30b, 31b of the support walls 30, 31 where the core is releasably secured by a spring catch generally designated 32. The catch 32 includes spring portions 33, which are coiled about a pin 34 between the side walls 30, 31, and a hook finger 35 which is resiliently biased by the spring portions 33 toward the hooks 30a, 31a and into releasable holding engagement with the core C.

As shown in the drawings, the pin 34 is disposed at right angles to the holder pins 22b and 23b so that the grip of the finger 35 and hooks 30a, 31a on the core C is at right angles to the grip of the holder walls 22, 23 on the skeletal walls of the core.

Additional support is provided the core C by a pair of plates 36 and 37 which are loosely secured, as by pins 71, to the holders 22 and 23, respectively. The plates 36 and 37 are disposed in the same horizontal plane and have arcuately curved inner edges which are serrated as at 36a, 37a and lightly grip and provide inward and downward support for the upper skeletal portion of the core C when the holder walls 22 and 23 are closed and the holder is rotated to discharge the crab meat from the core through the passages 25.

Rotation of the shaft 18 is effected by a motor M through a belt 38 and suitable pulleys 39 and 40, respectively, secured on shaft M' and the spinner shaft 18. As shown in Fig. 3, the motor is secured by bolts 41 to a bracket 42 which is a part of the frame 11. Preferably the motor M is continuously operated and has a built in clutch and brake, indicated generally at 43, including a lever 43a which is pivoted at 44 and may be moved selectively to drive, brake and free the shaft M'.

The lever 43a is shown in Fig. 3 in "brake" position to which it normally is drawn by a connecting rod 45, one end of which is secured to a lever 46. The lever 46 is supported for pivotal movement by a pin 47 and is resiliently urged by a spring 48 so as to place tension on the rod 45 and draw the lever 43a to "brake" position.

Figures 4, 8:
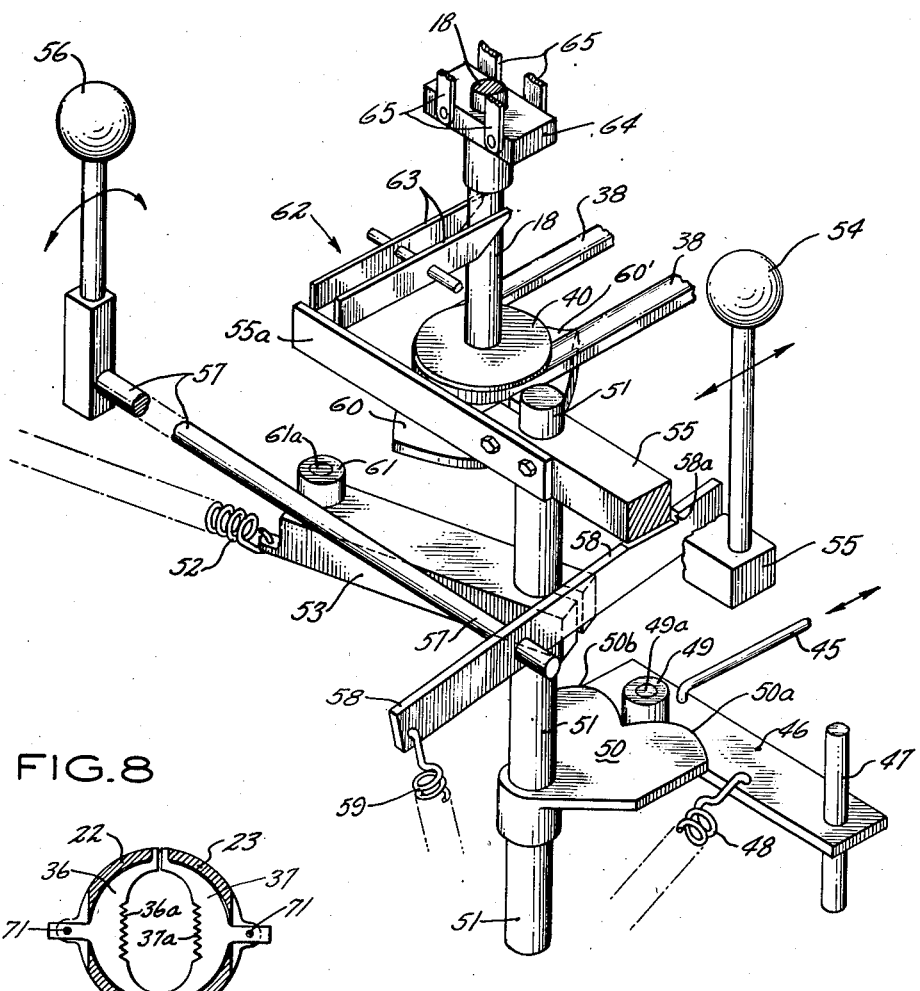
Fig. 4 is a perspective view of operating controls and portions of the drive and orienting mechanisms of the apparatus.
Fig. 8 is a cross-section view taken on line 8—8 of Fig. 6.

As best shown in Fig. 4, the lever 46 has a pin 49a which rotatably supports a cam roller 49 which engages a generally heart-shaped cam 50 that is secured on a vertical shaft 51 which is rotatable in the frame 11.

A spring 52 which is tensioned between the frame 11 and the outer end of a lever 53, the inner end of which is secured to the shaft 51, resiliently holds the shaft 51 so that the low point of the V of the heart cam 50 registers with the cam roller 49 in which position the spring 48 draws the lever 46 and connecting rod 45 to their fully retracted positions in which the drive pulley 39 is firmly braked.

Figure 2:
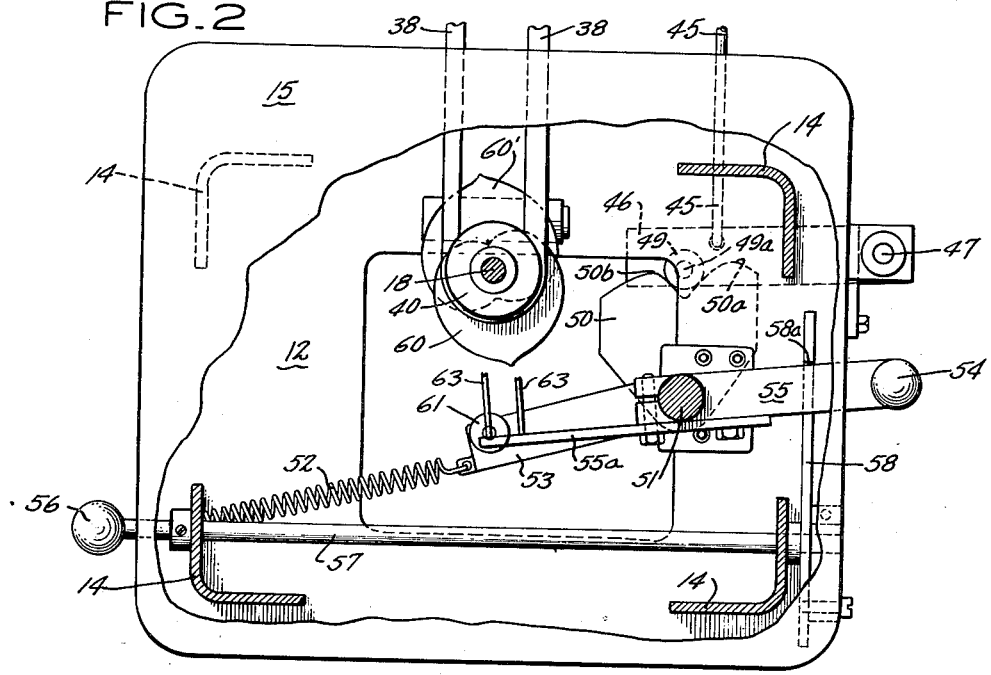
Fig. 2 is a top plan view partly broken away and with the crab meat collector removed to shown details of the drive and orienting mechanism for the core holder.

Movement of the clutch lever 43a to "drive" position is effected manually by pressing on a handle 54 which is secured to the outer end of a lever 55, the inner end of which is secured to the shaft 51. Pressing on the handle 54 rotates counterclockwise (Fig. 2) the shaft 51 and thereby rotates the cam 50. Thereupon, lobe 50a of the cam 50 forces the roller 49 and the lever 46 against the bias of the spring 48 and advances the clutch lever 43a by means of the connecting rod 45 through a "free wheeling" position to a "drive" position in which the clutch 43 couples the drive pulley 39 to the motor so as to rotate the spinner shaft 18.

As a safety precaution so that both hands of the operator must occupy positions of safety from the extractor 21 when the drive shaft 18 is rotated, the handle 54 must be pressed with the operator's right hand and a second handle 56, which is located at a distance from the handle 54, must be pressed with the left hand. Pressure on the handle 56 rotates a shaft 57 on which the handle is secured and pivots a latch 58 downwardly (Fig. 4) against the pull of a spring 59. Downward movement of the latch 58 moves safety stop 58a out of restraining engagement with lever 55 and permits the handle 54 to advance to "drive" position.

When the handles are released the springs 48 and 52 return the clutch 37 to the "brake" position shown in Fig. 4 and the spring 59 raises the latch 58 to the latching or "safety" position.

In order to facilitate loading and unloading of cores C in the holder 21, it is desirable that the holder 21 and the shaft 18 to which it is secured, always index at the same position after every spinning operation. For this purpose, there is secured to the bottom of the shaft 18 a heart cam 60 which is engageable with a cam roller 61 which is rotatably mounted on a pin 61a that is secured at the outer end of the lever 53. When the operator pulls on the handle 54, the resulting rotation of the shaft 51 causes lobe 50b of the cam 50 to advance the follower 49 and the lever 46 together with the connecting rod 45 to the clutch lever 43a. The cam lobe 50b has a slightly lesser radius from the cam shaft 51 than the cam lobe 50a and forces the clutch lever 43a only to the "free wheeling" position which is short of the "drive" position. Thereafter further pull on the handle 54 engages the cam roller 61 with the cam 60 and rotates the spindle shaft 18 to the desired position of orientation, at which position the roller 61 seats in the V portion of least radius of the cam 60. Thereafter when the handle 54 is released, the spring 52 returns the cam shaft 51 to the normal or "brake" position in which the brake holds the spindle 18 in the desired position of orientation for loading and unloading.

In order to dynamically counterbalance the spindle 18 against the unbalance of cam 60, a second identical cam 60' is secured on the spindle 18 at 180° to the cam 60 and out of the path of the cam roller 61.

A safety stop 62 is provided which automatically prevents retraction of the handle 54 and movement of the roller 61 into the path of the cam 60 while the spindle 18 is being motor driven. More particularly, the safety stop includes a pivoted lever 63, one end of which straddles the shaft 18 and the other end of which normally is in the path of an extension 55a of lever 55, to which position the lever 63 is pivoted by gravity and in which position it prevents movement of the roller 61 into the path of the cam 60 whenever the spindle 18 is motor driven. However, when the spindle 18 is not motor driven, the members 22a and 23a swing downwardly to the position shown in Fig. 7 and lower a cross head 64 to which they are connected by links 65. The lowered cross-head 64 engages and pivots the lever 63 out of the path of the lever extension 55a so that the cam roller 61 may be moved into engagement with the spindle indexing cam 60.

Figure 6:
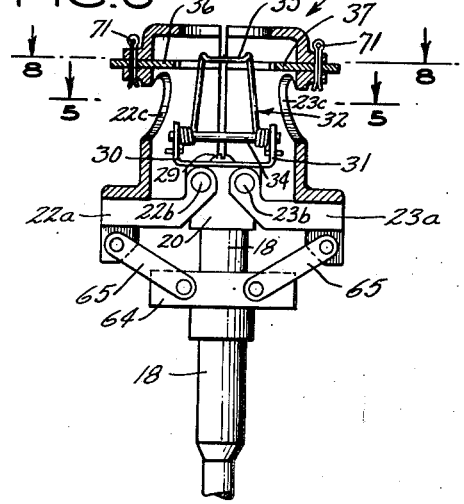
Fig. 6 is a cross-sectional view taken on line 6—6 of Fig. 5.
Figure 7:
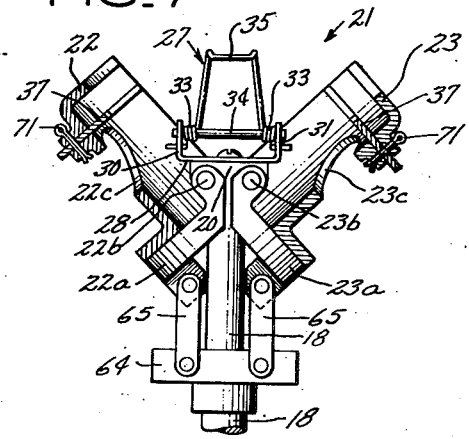
Fig. 7 is a cross-sectional view similar to Fig. 6 and showing the holder in the open or loading and unloading position.

When the spindle 18 is motor driven, the centrifugal force pivots the holder members 22 and 23 to the closed position shown in Fig. 6, thereby raising the cross-head 64, and the stop lever 63, relieved of the weight of cross-head, moves to the safety position shown in Fig. 4.

Operation of the heretofore described crab meat extractor generally is as follows:

With the spindle shaft 18 at rest, the hinged shroud or holder halves 22 and 23 are open and provide free and easy access to the holder 27 on the spindle head or block 20 which carries the hinge pins 22b and 23b for the shroud halves 22 and 23.

A core C is placed on the curved edge supports 30b and 31b with the hard shell side downward and with the rear portion under the hooks 30a and 31a which are positioned so as to center the core. The spring finger 35, which has been held forward by the operator while the core is being placed on the holder 27, is released whereupon the finger 35 resiliently grips the tail-hinge of the crab and holds the core on the holder and against the hooks 30a and 31a.

The grip of the finger 35 positions and retains the core during acceleration of the spindle 18 until centrifugal action closes the shroud halves 22 and 23. Thereafter the centrifugal force of the finger 35 counteracts the force of the spring 33 and the finger is restrained from excessive opening by engagement with the shroud. Preferably the closed shroud members 22 and 23 afford support at right angles to the support of the finger 35 and hooks 30a, 31a when the shaft 18 is rotated.

With the core cradled and secured in the holder 27, the operator presses forward with the left hand on the handle 56 thereby depressing latch 58 and removing the restraint of the stop 58a on the lever 55. The handle 54 is pressed forward by the operator with the right hand thereby rotating the shaft 51 and cam 50 and advancing the clutch lever 43a through the "free wheeling" to the "drive" position in which the clutch 43 couples the drive pulley 39 to the motor and rotates the spinner shaft 18 at high speed.

The centrifugal force of the rapidly rotating shroud base members 22a and 23a closes the shrouds 22 and 23 which provide support for the skeletal structure of the core C about the core outlets 25 all of which are aligned with the shroud openings 22c and 23c. Additional support is provided the upper portion of the core C by the plates 36 and 37. Preferably the plates 36 and 37 are loosely secured in the respective shroud members 22 and 23 so that their weight causes them to sag inwardly and downwardly. Thus centrifugal action of the rotating shroud increases the downward force of the serrated edges 36a and 37a on the core in addition to providing inward support against destructive centrifugal action.

The high speed rotation of the shrouded core, causes the crab meat to discharge through the skeletal openings 25 of the core and out through the shroud openings 22c and 23c into a collector generally designated C.

Preferably, the collector C includes a soft rubber wall 67 or similar member for cushioning the force with which the travel of the extracted crab meat is interrupted.

In the illustrated embodiment, the soft rubber wall 67 is tubular and of smaller diameter when unstretched than the diameter of a cylinder support 68 to which the top and bottom edges of the wall 67 are stretched and secured as by elastic loops 69 or similar removal and replaceable restraining fasteners. Thus the central portion of the tubular rubber wall 67 is substantially unstretched and free from any rigid backing so as to provide a soft yielding wall to brake the travel of the crab meat discharged thereagainst.

The crab meat drops from the wall 67 into a collector 70 which is aligned and concentric with the wall 67 and with the extractor shroud and spindle 18.

During rotation of the spindle 18, the cross head 64 is raised by the shroud members 22a, 23a and the connecting links 65. Thus the lever 63 is free of the weight of the cross head and automatically swings to the safety position in the path of the lever extension 55a so that the operator cannot pull the handle 54 and move the cam roller 61 into destructive engagement with the cam 60 which is attached to and rapidly rotating with the driven shaft 18.

The meat is quickly extracted by the rapid rotation of the core C, and thereafter the operator removes his hands from the handles 54 and 56 whereupon the springs 52 and 59 return the handles to the "brake" and the "safety latch" positions shown in Fig. 4.

The rotation of the spindle 18 is quickly stopped by the brake whereupon the shroud sections 22 and 23 automatically fall open and the weight of the descending cross head 64 swings the lever 63 out of the path of the lever 55a so that pull on the handle 54 by the operator indexes the core holder 21 in the loading and unloading position. More particularly, when the operator pulls on the handle 54, the resulting rotation of the shaft 51 causes lobe 50b of the cam 50 to advance the follower 49 and the lever 46 together with the connecting rod 45 and move the clutch lever 43a to the "free wheeling" position. Thereafter further pull on the handle 54 engages the cam roller 61 with the cam 60 and rotates the spindle shaft 18 to the desired position of orientation, at which position the roller 61 seats in the V portion of least radius of the cam 60. Thereafter when the handle 54 is released, the spring 52 returns the cam shaft 51 to the normal or "brake" position in which the brake holds the spindle 18 in the desired position of orientation for loading and unloading.

The loading position is preselected by proper adjustment of the cam 60 to provide the most efficient angular position of the core holder 21 for loading and unloading.

Unloading of the empty core from which the meat has been extracted is effected prior to reloading with a fresh core and repeating the meat extracting operation.

Apparatus embodying the invention provides for rapid and effective extraction of crab meat. A spinning action of only short duration is required. The meat recovered is substantially free of skeletal parts and is ready for dipping and other operations incidental to packing.

The diameter of the cutting tool should be such that the annular cut lies just within the knuckles of the crab, in order that the maximum amount of meat will be contained in the cores. While crabs vary somewhat in their dimensions, cutting tools of two different diameters are ordinarily sufficient for the purpose and a dimensionally different spinning holder 21 is preferable for each cutter size.

I claim:

1. In apparatus for centrifugally extracting the meat from crabs, the combination of a holder mounted vertically for rotation on its axis, said holder having wall portions to support the skeletal portions of a core cylindrically cut from the body of a crab, said wall portions providing support for the skeletal portions adjacent openings in the core through which crab meat is discharged when the core is rotated with the holder and said wall portions of the holder having passageways generally aligned with the openings in the core through which meat is centrifugally discharged when the holder and crab are rotated, drive means for rotating the holder to effect discharge of crab meat through said core openings and aligned passageways in the wall portions of the holder and manually operable clutch means for operatively connecting the drive means and the holder and wherein the holder is a multipart unit including means which automatically open the holder parts when rotation of the holder stops and which automatically close the parts to support the skeletal portions of the core when the holder is rotated.

2. Apparatus as recited in claim 1 wherein said holder parts are vertically disposed cylindrical members each having a semicircular cross-section which provide a cylindrical holder of circular cross-section when the holder parts are rotating and closed, and a semicircular plate member loosely supported in each holder part and providing support inwardly and downwardly on the upper part of the core remote from the ventral surface when the core and core holder are rotated.

3. Apparatus as recited in claim 2 and wherein said holder includes means for resiliently gripping the ventral portion of the core and wherein the resilient pressure is exerted by said means in the direction of the parting line of the cylindrical holder members.

4. In apparatus for centrifugally extracting the meat from crabs, the combination of a holder mounted vertically for rotation on its axis, said holder having wall portions to support the skeletal portions of a core cylindrically cut from the body of a crab, said wall portions providing support for the skeletal portions adjacent openings in the core through which crab meat is discharged when the core is rotated with the holder and said wall portions of the holder having arcuately shaped passageways generally aligned with the openings in the core through which meat is centrifugally discharged when the holder and crab are rotated, drive means for rotating the holder to effect discharge of crab meat through said core openings and aligned passageways in the wall portions of the holder and manually operable clutch means for operatively connecting the drive means and the holder wherein said holder includes means for resiliently gripping the core in a direction generally at right angles to a direction of support of said wall portions of the holder.

5. In apparatus for centrifugally extracting the meat from crabs, the combination of a holder mounted vertically for rotation on its axis, said holder having wall portions to support the skeletal portions of a core cylindrically cut from the body of a crab, said wall portions providing support for the skeletal portions adjacent openings in the core through which crab meat is discharged when the core is rotated with the holder and said wall portions of the holder having arcuately shaped passageways generally aligned with the openings in the core through which meat is centrifugally discharged when the holder and crab are rotated, drive means operatively connected to the holder for rotating the holder to effect discharge of crab meat through said core openings and aligned passageways in the wall portions of the holder and manually operable clutch means associated with the drive means for operatively connecting the drive means and the holder and including means associated with the holder which automatically orient said holder in a preselected position of rotation when the clutch connection between the holder and drive means is disengaged.

6. In apparatus for centrifugally extracting the meat from crabs, the combination of a holder mounted vertically for rotation on its axis, said holder having wall portions to support the skeletal portions of a core cylindrically cut from the body of a crab, said wall portions providing support for the skeletal portions adjacent openings in the core through which crab meat is discharged when the core is rotated with the holder and said wall portions of the holder having arcuately shaped passageways generally aligned with the openings in the core through which meat is centrifugally discharged when the holder and crab are rotated, drive means operatively associated with the holder for rotating the holder to effect discharge of crab meat through said core openings and aligned passageways in the wall portions of the holder and manually operable clutch means associated with the drive means for operatively connecting the drive means and the holder and including means associated with the holder for automatically braking rotation of the holder when the clutch connection between the holder and drive means is disengaged.

7. In apparatus for centrifugally extracting the meat from crabs, the combination of a holder mounted vertically for rotation on its axis, said holder having wall portions to support the skeletal portions of a core cylindrically cut from the body of a crab, said wall portions providing support for the skeletal portions adjacent openings in the core through which crab meat is discharged when the core is rotated with the holder and said wall portions of the holder having arcuately shaped passageways generally aligned with the openings in the core through which meat is centrifugally discharged when the holder and crab are rotated, drive means associated with the holder for rotating the holder to effect discharge of crab meat through said core openings and aligned passageways in the wall portions of the holder, manually operable clutch means associated with the drive means for operatively connecting the drive means and the holder and including means associated with the holder for automatically braking rotation of the holder when the clutch connection between the holder and drive means is disengaged, including manually operable means associated with the holder for disconnecting the holder from the brake means, and means associated with the holder for automatically orienting the holder in a preselected position of rotation while the clutch correction between the holder and the drive means is disengaged.

8. In apparatus for centrifugally extracting the meat from crabs, the combination of a holder mounted vertically for rotation on its axis, said holder having wall portions to support the skeletal portions of a core cylindrically cut from the body of a crab, said wall portions providing support for the skeletal portions adjacent openings in the core through which crab meat is discharged when the core is rotated with the holder and said wall portions of the holder having arcuately shaped passageways generally aligned with the openings in the core through which meat is centrifugally discharged when the holder and crab are rotated, drive means associated with the holder for rotating the holder to effect discharge of crab meat through said core openings and aligned passageways in the wall portions of the holder, manually operable clutch means associated with the drive means for operatively connecting the drive means and the holder and including means associated with the holder for automatically braking rotation of the holder when the clutch connection between the holder and drive means is disengaged, including manually operable means associated with the holder for disconnecting the holder from the brake means, and means associated with the holder for automatically orienting the holder in a preselected position of rotation while the clutch correction between the holder and the drive means is disengaged and including safety means associated with the orienting means and automatically actuated to render said orienting means inoperative when the holder is rotating.

References Cited in the file of this patent

UNITED STATES PATENTS

| 1,520,190 | Lieberman | Dec. 23, 1924 |
| 2,522,578 | Johnson | Sept. 19, 1950 |

FOREIGN PATENTS

| 18,671 | Great Britain | 1909 |